V. G. APPLE & G. B. SAYRE.
ELECTRICAL INDICATING AND REGULATING APPARATUS.
APPLICATION FILED APR. 1, 1914.

1,158,954.

Patented Nov. 2, 1915.
2 SHEETS—SHEET 1.

Witnesses
Inventors:
Vincent G. Apple
and Gordon B. Sayre,

UNITED STATES PATENT OFFICE.

VINCENT G. APPLE AND GORDON B. SAYRE, OF DAYTON, OHIO, ASSIGNORS TO THE APPLE ELECTRIC COMPANY, OF DAYTON, OHIO, A CORPORATION OF OHIO.

ELECTRICAL INDICATING AND REGULATING APPARATUS.

1,158,954.  Specification of Letters Patent.  Patented Nov. 2, 1915.

Original application filed October 6, 1913, Serial No. 793,526. Divided and this application filed April 1, 1914. Serial No. 828,717.

*To all whom it may concern:*

Be it known that we, VINCENT G. APPLE and GORDON B. SAYRE, citizens of the United States, all residing at Dayton, in the county of Montgomery and State of Ohio, have invented certain new and useful Improvements in Electrical Indicating and Regulating Apparatus, of which the following is a specification.

This invention relates to improvements in electrical indicating and regulating apparatus.

It is particularly adapted for use in connection with lighting systems wherein a dynamo operates to supply current for the lights and to maintain the batteries at a proper charge.

One of the objects of our invention is to provide a combined indicator and automatic electric switch whereby to conspicuously indicate, in readable words, the position of the concealed switch moving part; the condition of the switch, or circuit, affected by such movement, or other information, by movement of one or more letters, or parts thereof to constitute a word, that may be displayed by the operation of said switch on the face of the indicator.

Another object of our invention is to provide, in connection with our improved indicating switch, circuit connections whereby the operation of the system is independent of the manner in which the battery may be connected into circuit. Reversing the terminals of the battery operates to reverse the polarity of the indicator and the polarity of the generator.

Other and further objects of our invention will become readily apparent to persons skilled in the art from a consideration of the following description, when taken in conjunction with the drawings, wherein—

Figure 1:
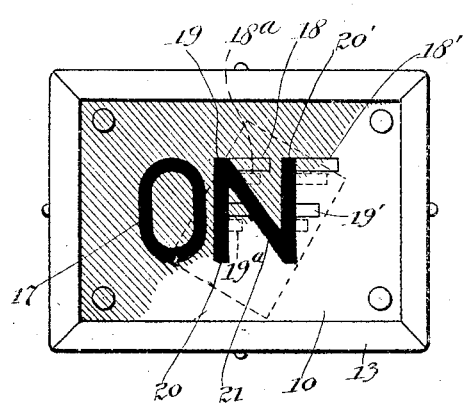
Figure 2:
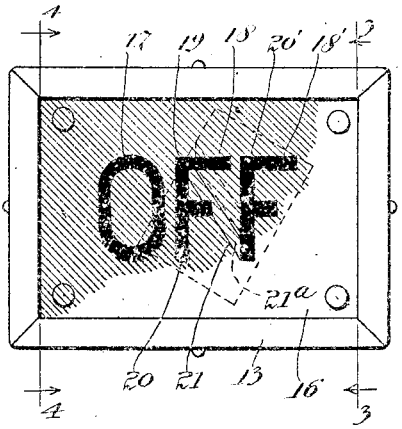
Figure 3:
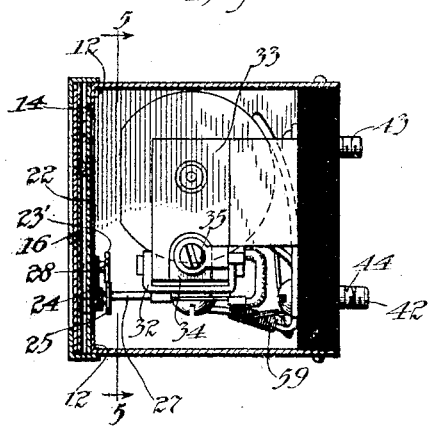
Figure 4:
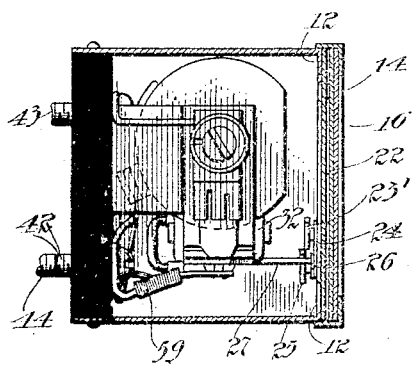
Figure 5:
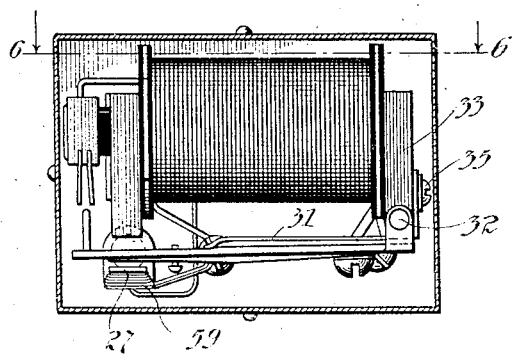
Figure 7:
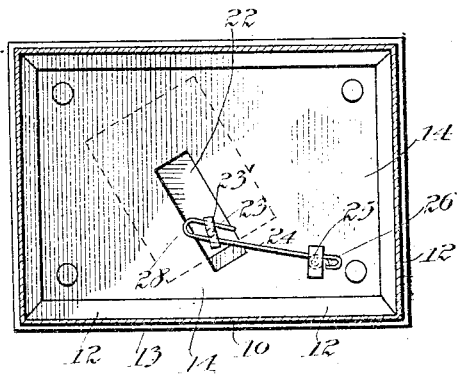
Figure 6:
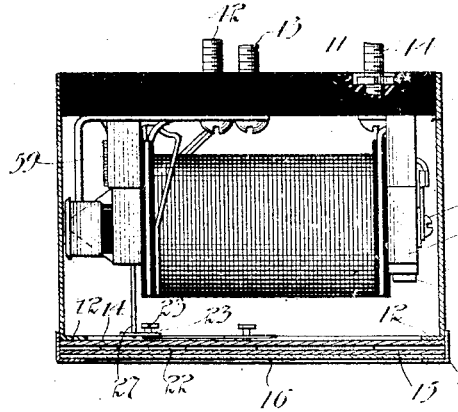
Figure 8:
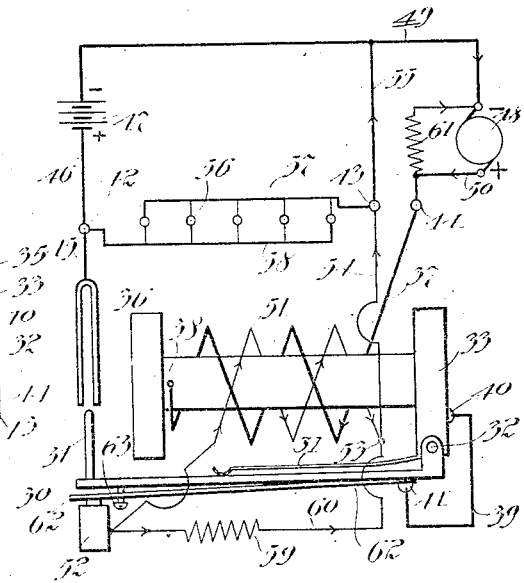

Figure 1 is a front view of the indicator and switch containing casing showing the word "On" in relatively large letters, displayed on the front of the casing. Fig. 2 is a similar view showing the word "Off" significant of a different condition, effected by movement of the switch part. Fig. 3 is a transverse section, taken on line 3—3 of Fig. 2. Fig. 4 is a similar section taken on line 4—4 of Fig. 2. Fig. 5 is a longitudinal section, taken on line 5—5 looking in the direction of the upper arrow, of Fig. 3. Fig. 6 is a similar section, taken on line 6—6 of Fig. 5. Fig. 7 is a section, taken on line 5—5 of Fig. 3, looking in the direction of the lower, or bottom arrow. Fig. 8 is a diagram of electric circuits with which the device may be advantageously associated.

In all the views the same reference characters indicate similar parts.

The indicating mechanism and parts therefore are described and claimed in our copending application, Serial No. 793,526 for improvements in electrical indicators filed by us October 6th, 1913, of which this present application is a division.

The movement of switch moving parts, or the electro-responsive element of electro-magnets, such as the armature thereof, is usually confined to rather narrow limits. The permissible excursion of such movement being not sufficient to properly effect the display of a relatively large and conspicuous indication, of an indicator, without the use of gearing complication, or the abnormal multiplication of levers, with the objections attending such extended movements.

Our invention contemplates the use of relatively large letters, to constitute a word, or readable words, to be displayed on the face of the indicator, when the indicator-moving means is moved in a given direction, and means for shifting a part, or parts, of one or more of said letters, to constitute another, or different word when said moving means is shifted in the reverse direction.

An exemplification of one use for our invention may be found in the lighting circuits of an automobile, boat, or the like, wherein the main line circuit, containing translating devices, such as electric lamps and the like, is to be supplied with current jointly by a dynamo-electric machine and a storage battery. It is well to cut the battery into circuit only after the armature has attained a predetermined voltage, whereupon, in our apparatus, an automatically operable circuit closing switch moves suitable switching mechanism to cut on to the circuit the associate storage battery, at which time the indicator is moved so as to announce "On," signifying that the battery is on the operative circuit. When the armature of the automatic switch-moving electromagnet is restored to its normal position, as when the armature of the dynamo ceases to rotate, and the circuit is opened the announcement is then changed to "Off," which signifies that the battery is now off or that the main circuit is open.

To preserve the effect of positive operation of the switch moving part; wherein an electro-magnet is employed to produce such movement, the limit of movement must necessarily be small and therefore the peculiar arrangement of our indicating means permits us to combine, with such small moving parts, large and very conspicuous indications, and to preserve the relatively small compass of the switching and indicating device, limited to the size of the switch casing.

We have shown, in the accompanying drawings, one means for carrying our invention into effect, wherein—

10 is a casing, removable from the base 11. Secured to the flanges 12, that surround the open end of the casing, is an index box 13, having a bottom 14 and a parallel, spaced-apart metal face plate 15, that is located behind a glass plate 16. On the plate 15, is painted, or otherwise applied thereto, the letters, or parts of letters, to constitute the word, or words, to be displayed on the front of the casing. In this particular instance the letter O, indicated by the reference character 17, remains unchanged because it appears in each of the words "On" and "Off."

The plate 14 is perforated, as at 18—18' and 19—19' to provide slots for forming the letters F, F with each of the two parallel, vertical lines 20—20'. These two lines also remain unchanged, as they are each a component part of the letters F, F and together they are component parts of the letter N. The plate 14, is obliquely perforated, as at 21 to provide a slot for forming the letter N in conjunction with the two vertical lines 20—20', as when the perforations 18—18' and 19—19' are not provided with black back grounds.

If the slots 18—18' and 19—19' are open, or are each provided with a white back ground, and the oblique slot 21 is provided with a black back ground, the combination will make the letter N, as shown in Fig. 1, but if the slots 18—18' and 19—19' are provided with black back ground and the oblique slot 21 is provided with a white back ground the combination will make the two letters F, F. In one instance the letters on the front of the indicator will read "On" and in the other instance the letters will read "Off."

The component parts which form the incomplete letters in the instance cited, move obliquely with reference to the vertical portions of the letter, and these parts we will now describe. Located between the plates 14 and 15, which plates are spaced apart for the purpose, is a movable or sliding plate 22, shown in dotted lines in Figs. 1, 2, and 7. This plate has painted upon its front face the black portions necessary to provide the required parts for the incompleted letters when the plate is shifted, as indicated by dotted lines, and shown by reference characters 18$^a$, 19$^a$, and 21$^a$ respectively. The remaining portion, of the face of the obliquely shiftable plate 22 is painted white, to correspond with the white face plate 15. Secured to the plate 22 is a pin 23 having an enlarged head 23'. A lever 24 is pivoted, as at 25, and extends therebeyond to form a short lever 26, having a loop, or slotted portion for engagement with the pin 27. The extended end of the lever 24, also provides a slot, by means of a loop 28. This loop engages the pin 23 that is connected to the obliquely slidable plate 22. The plate is guided by means of a rearward projection which extends through an oblique slot in the plate 14. The pin 27, is placed in the loop 26 of the lever, and when the armature 30, of the electromagnet, is energized, it moves the pin 27 and thereby operates the obliquely placed plate 22.

The armature 30, of the switch moving electro-magnet, carries a switch blade 31, and is pivoted to the electro-magnet core, as at 32. When the armature 30 is attracted by the energized electro-magnet 33, the pin 27, which engages the slotted end 26, of the lever 24, moves the said lever and therefore the plate 22, so that the oblique black line 21$^a$, on the plate 22, is shifted to a position immediately under the oblique slot 21 and at the same time the black portions 18$^a$ and 19$^a$ of the letters F, F are shifted from under the slots 18—18' and 19—19' thereby converting the word "Off" to "On" and indicating that the circuit is closed between the dynamo and storage battery. The armature 30, of the electro-magnet, is held in this position during the time that the circuit is closed and the word "On" during that period of time, will appear upon the indicator face, but just as soon as the circuit is open and the armature of the electro-magnet is retracted, by a means to be hereinafter described, the obliquely shiftable plate 22 is moved back to its original position by the spring that retracts the armature, converting the word "On" into the word "Off," in the manner heretofore described, indicating that the circuit is now open and that the storage battery is not connected with the dynamo electric machine. Thus parts of letters may be transposed or entire letters substituted in a word or words.

A spring 34 is secured to one end of the magnet core 33, as by a screw 35. This spring resiliently holds the armature of the electromagnet in its retracted position, and thereby normally maintains the circuit open. The coöperating electric switch blade 36, consists of a U shaped plate, for insertion of the switch blade 31 that is carried by the armature 30, so that when the armature is attracted, the blade 31 enters the space between the two legs of the U-shaped plate and closes the electric circuit.

The armature 30 is connected by a wire 39, to the body of the core, as by means of a screw 40, and with the pivoted armature 30, as at 41, so that the loose joint, as at 32, will not interpose a variable resistance in the dynamo circuit. The connecting screws 42, 43, and 44 constitute terminals of the electro-magnetic switch. The terminal 42 is connected to the switch blade, by means of a wire 45, and it is connected to the storage battery 47, by means of a wire 46. The other, or negative terminal of the battery 47, is connected to the negative terminal of the dynamo 48, by means of a wire 49. The positive terminal of the dynamo is connected to the terminal 44 of the switch, by means of a wire 50, thus completing the circuit through the dynamo storage battery and through the series coil of the switch magnet, in series relation, when the circuit controlled thereby is closed. A high resistance coil 51 is wound on the core 33 of the magnet in such direction that the current therein will augment the magnetic effect produced by the coil 37. The high resistance magnet coil 51 is connected to a contact piece 52 and the other terminal is connected, as at 53, to a wire 54 that is connected in turn to the terminal 43, of the switch device, and this terminal 43, is connected to the wire 49, by means of a wire 55.

The translating devices 56 such as electric lamps, and the like, are connected in parallel relation between the terminals 42 and 43 of the device on main line wires 57 and 58, so that these devices are always in parallel circuit with the battery, whether the circuit varied by the operation of the electro-magnetic device, is open or closed. A non-inductive relatively high resistance coil 59 is connected in parallel with the high resistance coil 51, one terminal of the coil 59 being connected to the contact 52, the other terminal being connected, by wire 60, to the contact point 53.

61 is the winding of the shunt field magnet of a constant potential dynamo electric machine.

A resilient tongue 62 is carried by and is connected to the armature 30, by means of the screw 41 and has limited yielding movement toward and from the armature, the extent of which movement is varied by adjustment of the screw 63, the screw passing through a relatively large hole made in the tongue 62. The end of the tongue bears with some force upon the contact 52 and permits independent movement of the armature 30, sufficient for the blade 31 to make contact with the coöperating switch blades 36 before the end of the tongue 62 leaves the contact 52, thereby holding the coil 51 in circuit after the switch has been closed and the coil 37, which is in series with the dynamo-electric machine, has been introduced into the circuit, by the closing of the switch. A further movement of the armature 30, however, serves to break contact between the tongue 62 and the contact piece 52 and open the circuit through the coil 51. The non-inductive resistance coil 59 being in shunt with the coil 51, and also having its circuit opened with reference to the main circuit takes the "kick" that might be produced by breaking the circuit of the coil 51 and thereby prevents sparking at the contact connection of the tongue 62, and the contact piece 52, when the circuit between these parts has been opened.

Now when a device, such as that which we have just described, is used in connection with an automobile and the casing exhibiting on its front the indicating letters, or words, is placed in such position as to be plainly visible to the driver or chauffeur, of such machine, he can see at a glance, by the relatively large words exhibited on the front of the indicator, whether or not the storage battery and the dynamo are connected together, or whether the circuit between these two sources of electric current has been opened and therefore he is enabled to ascertain at a glance whether the dynamo is charging the storage battery or whether the storage battery is affording all of the current that is necessary to supply the translating devices associated with the circuit. It is obvious that when the dynamo is at rest any one of the translating devices 56 by the closure of its switch will be connected directly to battery 47 through the feed wires 57 and 58. With the dynamo at rest no current flows through the coils of the electro-magnet and the armature is therefore retracted by the spring causing the display of the word "Off".

When the dynamo takes up its cycle of operation, current flows from its positive brush to the wire 50 into coil 37, thence through the core of the magnet 38 into the armature spring 62 to the contact 52, through the coil 51 and over wires 54, 55, and 49, to the negative brush of the dynamo. The passage of current through the two coils, in the same direction, energizes the magnet and draws the armature 30 down closing the switch 31—36, and breaking contact with the pin 52. This action shifts the reading of the indicator from "Off" to "On". The positive brush of the dynamo is now connected to wire 51, coil 37, core 38, armature 30, switch 31, 36, through wire 45 to the terminal 42, connected with the translating device feed wire 58. The other feed wire 57 is connected to the terminal 43 which is connected through the wires 55 and 49 to the negative brush of the dynamo. It is obvious that when connected in this manner the surplus current from the dynamo, not used in operating the translating devices 56, is available for recharging the battery 47, the positive brush of the dynamo being connected to the positive terminal of the battery.

As the device is particularly adapted for use in connection with a small lighting outfit, such as are used on boats, automobiles and the like, it frequently happens that the system is installed by one having comparatively little knowledge of electrical matters. Under ordinary circumstances in systems of this kind it is essential that the battery terminals be connected so that current will flow to the lead wires in one direction only. We have however provided in our system a means whereby the polarity of the generator is automatically reversed should the battery terminals be connected in the opposite manner from that shown in the drawings. Thus if we remove the battery 47 and reverse it so that the negative terminal is connected to the wire 46 and the positive terminal to the wire 49 the following operation will take place. With the dynamo at rest it is obvious that the translating devices 56 will operate just the same as if the battery were connected in the reverse direction. When the dynamo is started, however, its polarity being the same as under the previously described conditions, current will flow from the positive brush over wire 50 into the coil 37 in the direction indicated by the arrows. The current will complete its path through the core of the magnet, the armature, wires 55, 49, back to the negative brush as before. The armature will be attracted closing switch contacts 31—36. The battery 47 is now connected in series with the dynamo and current will flow from the positive terminal of the battery over the wire 49 through the dynamo. The voltage of the dynamo will then fall very low by reason of the heavy current drawn and current from the battery will flow through the shunt field in a reverse direction. Reversing the direction of current flow through the field reverses the polarity of the dynamo and consequently reverses the direction of current flow through the coil 37. This action reverses the polarity of the switch operating magnet and causes the repulsion of the armature 30, assisted by spring 31, breaking contact between the contact points 31—36 of switch. A repulsion of the armature causes it to make contact between its spring 62 and the contact 52, closing the circuit through the coils 51, 37 from the dynamo brushes. The current will now flow through both of the coils 37—51 in the reverse direction from that indicated by the arrows but as the polarity of the core 33 has been changed, the armature will now be attracted causing the closure of the switch contacts 31—36. The operative dynamo and battery circuits will now be reëstablished, the polarity of the dynamo and that of the indicator having been automatically reversed in order to properly conform to the reversed direction of flow of current from the battery lead wires. It is obvious, when this reversal of the battery lead wires takes place, that the indicator armature is first attracted, then repelled and then attracted. The indicator words therefore quickly snap from "Off" to "On" back to "Off" and then to "On" and remain "On".

The adjustment of the system to comply with the reversal of the battery polarity is therefore automatic and specific directions as to the manner in which the battery leads are to be connected is unnecessary in installing the outfit. This greatly simplifies the connecting up of the apparatus by those not skilled in electrical matters and increases its value.

While we have herein shown and described a single embodiment of our invention, for the purpose of clear disclosure, it is evident that changes may be made in the specific form and organization of the parts, within the scope of the appended claims.

Having described our invention what we claim is:—

1. The combination with a dynamo, and a battery, of a controller comprising an electro-magnet, having high and low resistance coils wound thereon, an armature therefor, and means including said armature for connecting both coils in series across the terminals of the dynamo when the armature is retracted and for cutting out the high resistance coil and including the low resistance coil in series with the battery and dynamo, when the armature is attracted.

2. The combination with a dynamo, and a battery, of a controller comprising an electro-magnet, having high and low resistance coils wound thereon, an armature therefor, and means including said armature for connecting both coils in series across the terminals of the dynamo when the armature is retracted, said coils aiding each other in producing a magnetic field in one direction, and for cutting out the high resistance coil and including the low resistance coil in series with the battery and dynamo when the armature is attracted.

3. The combination with a dynamo and a battery, of a controller comprising an electro-magnet, having high and low resistance coils wound thereon, an armature for the magnet, a switch having fixed and movable members, the movable member of which is carried by the armature, means normally holding said armature away from the magnet, a contact engaged by said armature when retracted, means connecting the low resistance coil in series with the armature and one side of the dynamo, a connector between the opposite side of the dynamo and one terminal of the battery, means connecting the opposite side of the battery with the fixed switch member, and means connecting one end of the high resistance coil with said contact and the other end of the high resistance coil with the connector between the dynamo and battery.

In testimony whereof, we hereunto set our hands.

VINCENT G. APPLE.
GORDON B. SAYRE.

In the presence of—
 MARIE N. O'CONNOR,
 T. M. FIGEE.